United States Patent [19]
Weiler et al.

[11] Patent Number: 5,860,495
[45] Date of Patent: *Jan. 19, 1999

[54] FLOATING CALIPER-TYPE DISK BRAKE FOR AUTOMOTIVE VEHICLES

[75] Inventors: Rolf Weiler, Eppstein; Dieter Bieraugel, Niddatal; Karl Storzel, Dreieich; Wolfgang Schiel, Frankfurt am Main, all of Germany

[73] Assignee: ITT Automotive Europe GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 557,080
[22] PCT Filed: Jun. 6, 1994
[86] PCT No.: PCT/EP94/01824
 § 371 Date: Dec. 5, 1995
 § 102(e) Date: Dec. 5, 1995
[87] PCT Pub. No.: WO94/29611
 PCT Pub. Date: Dec. 22, 1994

[30] Foreign Application Priority Data

Jun. 5, 1993 [DE] Germany .......................... 43 18 744.7

[51] Int. Cl.[6] .................................................. F16D 65/04
[52] U.S. Cl. .................................... 188/73.38; 188/250 E
[58] Field of Search .............................. 188/73.31, 73.32, 188/73.35, 73.36, 73.37, 73.38, 250 B, 250 E, 73.44, 73.45, 73.39

[56] References Cited

U.S. PATENT DOCUMENTS

| 4,424,886 | 1/1984 | Frigger et al. ........................ 188/73.39 |
| 4,905,796 | 3/1990 | Schonenberger et al. ........... 188/73.38 |
| 5,113,978 | 5/1992 | Weiler et al. ........................ 188/250 B |
| 5,330,035 | 7/1994 | Klimt et al. ......................... 188/250 E |
| 5,494,140 | 2/1996 | Weiler et al. ........................ 188/73.38 |
| 5,509,508 | 4/1996 | Evans ................................... 188/73.38 |

FOREIGN PATENT DOCUMENTS

| 4136107 | 5/1993 | Germany ............................. 188/73.38 |

Primary Examiner—Matthew C. Graham
Attorney, Agent, or Firm—J. Gordon Lewis; Thomas N. Twomey

[57] ABSTRACT

A floating caliper-type disk brake for automotive vehicles, for supporting the circumferential forces and for guiding the brake pads including a brake carrier integrated into the steering knuckle of the vehicle. To insure a simple final assembly on the vehicle and to facilitate an automatic assembly, the floating caliper with brake pads attached thereto is supplied as a pre-assembled unit. The brake pads by means of leaf springs secured to their back plates are detachably fixed to the floating caliper. In the practice of the invention, the leaf spring of the outer brake pad, additionally serves to radially prestress the floating caliper vis-à-vis the carrier arms of the brake carrier, thereby eliminating another spring provided for this purpose. The assembly of the floating caliper on the vehicle is simplified because there is no need to assemble the said additional spring.

7 Claims, 3 Drawing Sheets

FLOATING CALIPER-TYPE DISK BRAKE FOR AUTOMOTIVE VEHICLES

TECHNICAL FIELD

The present invention generally relates to automotive brakes and more particularly relates to floating caliper-type disk brake for automotive vehicles comprising a brake carrier forming an integral part of the steering knuckle of the automotive vehicle.

BACKGROUND OF THE INVENTION

A disk brake of the afore-mentioned type is known from DE-A-38 15 733. This disk brake comprises a floating caliper displaceably guided on the steering knuckle by means of two bolt guides. The two bolt guides form two support points for the floating caliper on the inner axial side. The back plate of the outer brake pad is used for additionally supporting the floating caliper on the outer axial side. The floating caliper is disposed either on a central projection of the brake pad serving as a third support point or on projections of the back plate lateral in the circumferential direction in the form of a four-point support. The brake pad, in turn, is supported on carrier arms of an integrated brake carrier.

Typically, the floating caliper is clamped in the radial direction vis-à-vis the carrier arms by means of a wire spring to prevent rattling from occurring. The floating caliper, by the wire spring, is rigidly forced radially inwardly against the back plate of the brake pad which, in turn, is rigidly forced against the carrier arms. No radially resilient movement of the floating caliper over the brake pad is provided. The outer brake pad is detachably fixed to the floating caliper by means of a leaf spring, with the latter also comprising a radially resilient spring tongue; however, the spring tongue in the outer brake pad has no function in the prior art system and is provided only in order to permit an identical design of the outer and inner brake pads.

As in a disk brake of the afore-mentioned type the carrier arms are integral parts of the steering knuckle of the automotive vehicle, the brake pads and the floating caliper must be mounted, during final assembly of the vehicles, by the vehicle manufacturer. The final assembly must be as simple as possible. The floating caliper is, therefore, supplied by the brake manufacturer together with the brake pads as a pre-assembled unit to the vehicle manufacturer for final assembly. However, the prior art floating caliper-type disk brake involves the disadvantage that after fixing the floating caliper by means of the two bolt guides, the wire spring is yet to be clamped between floating caliper and brake carrier, thereby substantially complicating assembly (especially automated assembly) of the floating caliper on the vehicle wheel.

It is the object of the invention to provide a floating caliper-type disk brake of a simple design, permitting a low-cost manufacture and an easy, preferably, automatic assembly on the vehicle wheel.

SUMMARY OF THE INVENTION

The present invention includes a leaf spring provided for fixing the outer brake pad at the same time for radially clamping the floating caliper vis-à-vis the brake carrier. To that extent, the wire spring conventionally required can be eliminated. The solution according to the invention involves the advantage that the material and manufacturing expenses as well as the weight of the brake are reduced. However, the primary advantage involved resides in that the floating caliper after fixing the bolt guides is automatically prestressed vis-à-vis the brake carrier, thereby eliminating corresponding assembling steps, and, in particular, substantially simplifying an automatic assembly.

In a preferred form of embodiment of the invention, the radial prestress of the brake pad vis-à-vis the floating caliper is achieved in an advantageous and simple way. The measures of the invention do not incur any additional manufacturing expenses. The depressions in the wall of the recess on the outer caliper knuckle with the radial stops thereof can be readily moulded during casting of the floating caliper.

Preferably, the point of contact of the spring tongue serving for radial prestresses is located in the immediate vicinity of the back plate of the brake pad, thereby insuring that the brake pad remains largely free from tilting moments thus being locked against tilting from its correct position of assembly. To that extent the shape of the spring tongue is particularly simple and practical, with the spring tongue, depending on the requirements placed upon the rigidity, being bent either in a V-shaped or in a W-shaped way. The W-shaped spring tongue is of a greater length, thereby involving a softer spring characteristic.

With a view to inventory control and supply of brake pads it is especially advantageous for the inner brake pad and the outer brake pad to be of identical design and for the brake to permit the use of identical brake pads for which corresponding measures will have to be taken.

In other embodiments of the invention, the movability of the brake pad in the circumferential direction is used for removing corrosion products from the supports on the carrier arms. The brake pad by means of the leaf spring thereof is centered in the circumferential direction between the abutment faces of the carrier arms. In each braking operation, the brake pad is driven by the brake disk in the circumferential direction and is forced against the carrier arm on the terminating side of the brake pad, thereby twisting and generating a scraping movement removing corrosion products from the abutment faces on the carrier arms and from the back plate of the brake pad. After each braking operation the prestress of the locking tongue of the leaf spring insures recentering of the brake pad.

Preferably, the leaf spring is fixed by means of a single rivet fastening, with the leaf spring being at the same time locked against twisting about the rivet connection. To that extent, the circular cross-section of a punched-through projection moulded out of the back plate, during riveting, is forced into a preferably square opening and is deformed until the said punched-through projection is substantially adapted to the square cross-section of the opening. Anti-twisting control is thus achieved by form-locking.

DETAILED DESCRIPTION OF THE PREFERRED EMBODIMENTS

Figure 1:
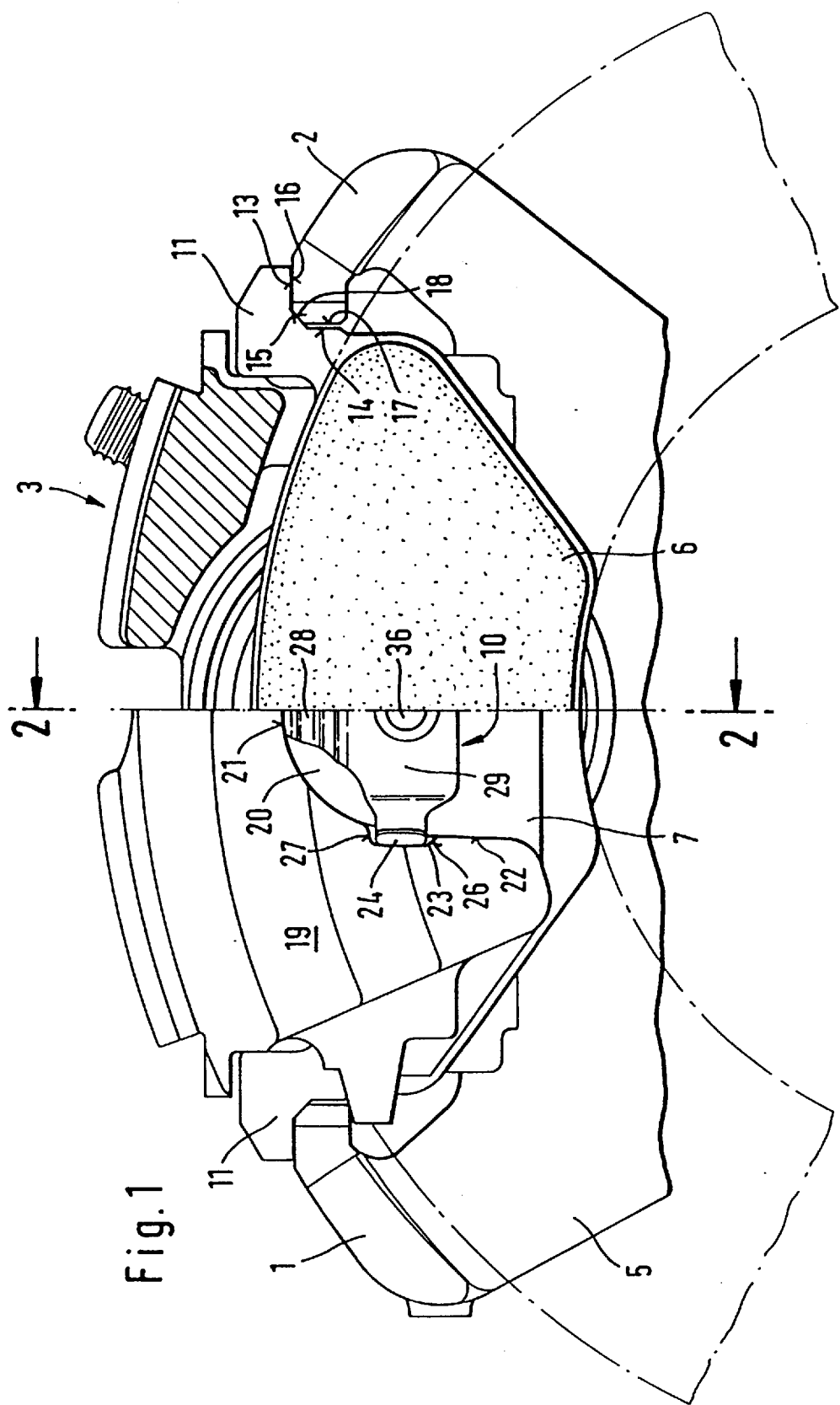
FIG. 1 is a side view, partly in section, of a floating caliper-type disk brake of the present invention mounted on the automotive vehicle.
Figure 2:
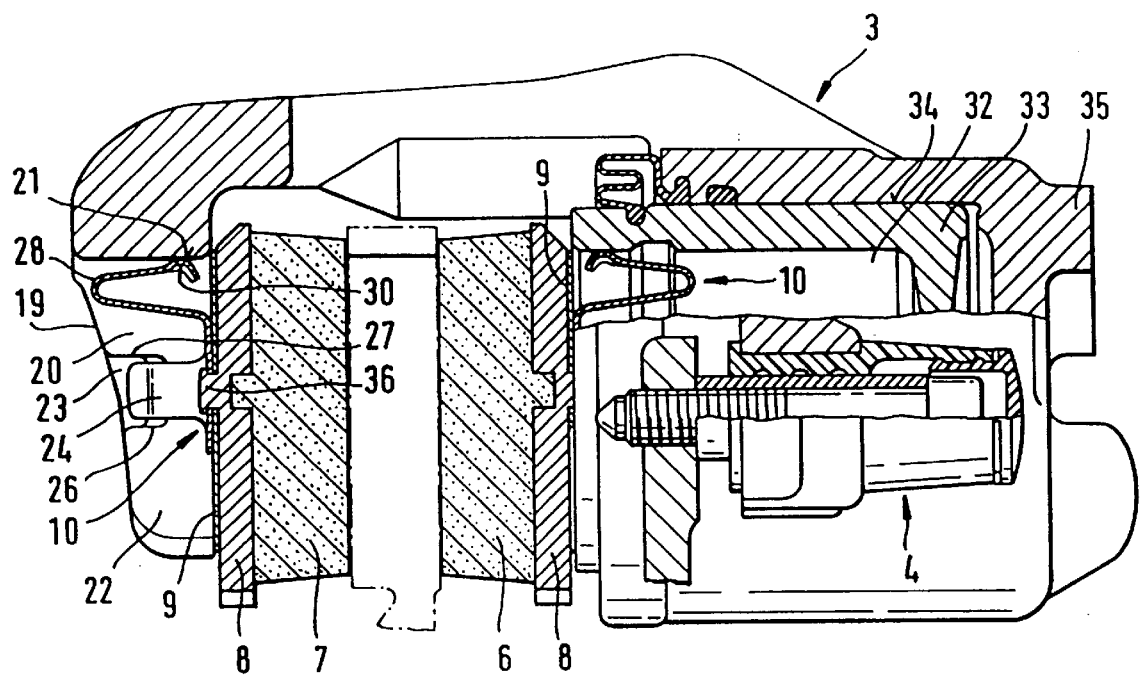
FIG. 2 is a view, partly in section, of the same disk brake along line A—A of FIG. 1.
Figure 4:
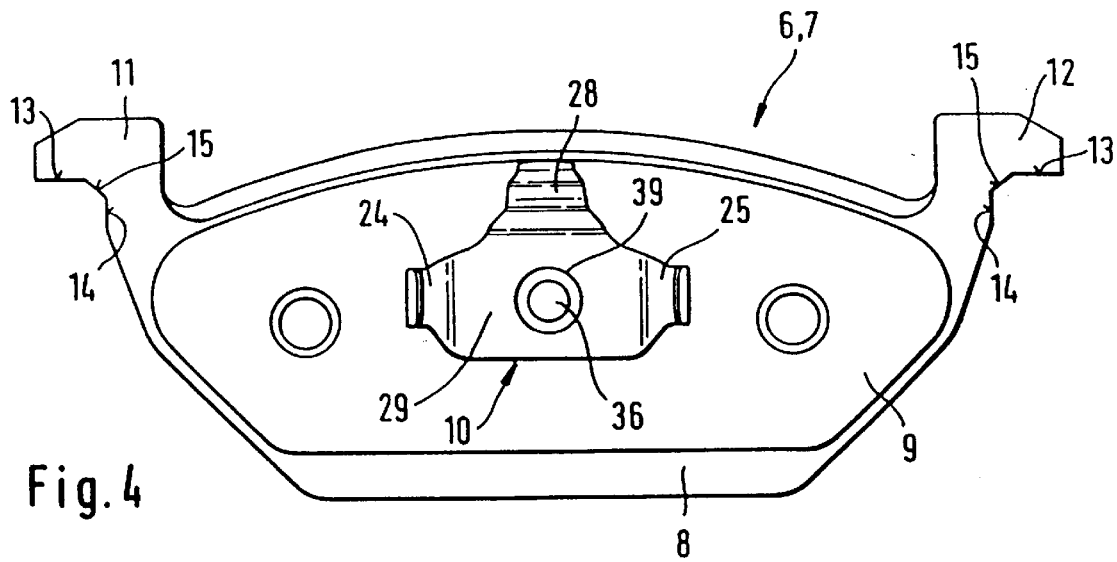
FIG. 4 is a plan view of a brake pad of the present invention.
Figure 5:
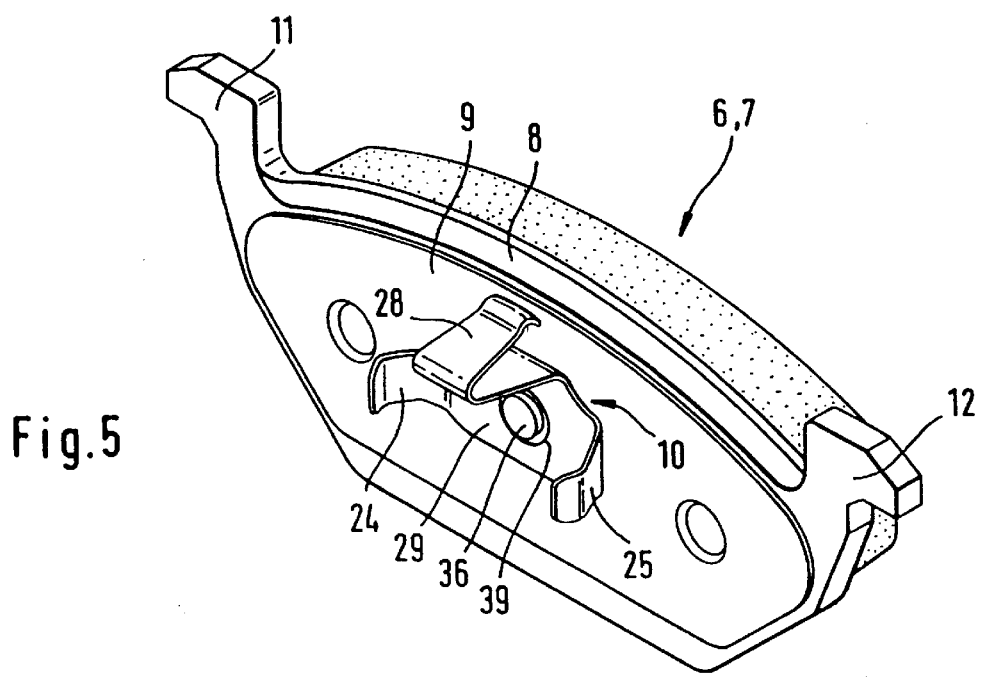
FIG. 5 is a perspective view of the brake pad.

FIGS. 1 and 2 show a floating caliper-type disk brake for automotive vehicles the brake carrier of which with the carrier arms 1,2 is integrated into the steering knuckle of the vehicle (not shown in any closer detail). A floating caliper 3 by means of two bolt guides 4 is arranged in an axially displaceable manner on the brake carrier. The floating caliper 3 embraces the outer edge of a brake disk 5 as well as two brake pads 6,7 of identical design which, incidentally, are also individually shown in FIGS. 4 and 5.

Each brake pad 6,7 comprises a back plate 8 carrying a friction pad on the rear side of which are secured a damping plate 9 and a leaf spring 10. The back plate 8 includes two L-shaped projections 11,12 protruding in opposite circumferential directions. Each projection 11,12 comprises a bearing face 13, a support face 14 arranged normal thereto and an oblique face 15 which on the one side thereof passes into the bearing face 13 and on the opposite side thereof passes into the support face 14. The carrier arms 1,2 include corresponding faces, with the bearing faces 16 for abutment with the bearing faces 13, the support faces 17 for abutment with the support faces 14 and the oblique faces 18 for abutment with the oblique faces 15.

The axially outer brake pad 7, in addition, is detachably secured to the outer knuckle 19 of the floating caliper 3 by means of a leaf spring 10. The outer caliper knuckle 19 contains a U-shaped recess 20 composed of a central wall section 21 and two adjacent wall sections 22 opposing one another in the circumferential direction. The opposing wall sections 22 are each provided with a depression 23 engaged by two anchoring tongues 24,25 of the leaf spring 10, thereby forcing the brake pad 7 in the axial direction against the outer knuckle 19. In this way, the outer brake pad 7 is detachably secured to the floating caliper 3.

The depressions 23 each include a radial inner stop 26 and a radial outer stop 27, with the space between them exceeding the width of the anchoring tongues 24,25. The anchoring tongues 24,25, hence, are radially displaceable between stops 26,27 so that the outer brake pad 7, generally, is held radially displaceable vis-à-vis the floating caliper 3. A central spring tongue 28 of the leaf spring 10 is in radial, resilient abutment with the central wall section 21 of the U-shaped recess 20 such that the outer brake pad 7 is resiliently supported on the outer knuckle 19 and is prestressed vis-à-vis the floating caliper 3 in the radial direction.

The leaf spring 10 includes a mounting section 29 which is riveted on the rear side of the back plate 8 to the brake pad 6,7. The mounting section 29, in the circumferential direction, passes into the anchoring tongues 24,25 which obliquely project from the back plate plane. Moreover, the spring tongue 28 emerges from a radial side of the mounting section 29 which tongue is bent outwardly in V-shaped manner substantially in the axial direction and back again inwardly. In view of this shaping the point of contact 30 of the spring tongue 28 is located in the immediate vicinity of the back plate 8 of the brake pad 6,7. This location has been selected to minimize the tilt moment generated by the prestressing force exerted on the point of contact 30.

Figure 3:
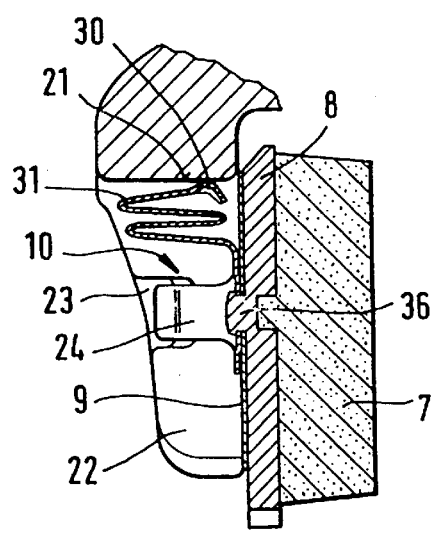
FIG. 3 is a sectional partial view according to FIG. 2 with a modified leaf spring.

FIG. 3 shows a modified spring tongue 31 also starting from the mounting section 29 of the leaf spring 10 which, however, is bent in a W-shape manner. The point of contact 30 for exerting a contact pressure on the central wall section 21, again, is at the same place as in the preceding form of embodiment. As opposed to the V-shaped spring tongue 28, the W-shaped spring tongue 31 is of a greater length and includes another spring characteristic. The W-shaped spring tongue 31, preferably, will be provided in applications where the prestress of a V-shaped spring tongue 28 is excessively high and if a softer support of the floating caliper 3 on the outer brake pad 7 is desired.

To achieve the advantage of a lower inventory control of spare parts and of an easy assembly, the inner brake pad 6 and the outer brake pad 7 are identically designed. In particular, the leaf springs 10 are identical in design. The inner brake pad 6 is detachably secured in a way similar to that of the outer brake pad 7 in that the spring leaf 10 with the anchoring tongues 24,25 and the spring tongue 28 thereof resiliently engages the interior 32 of a hollow brake piston 33. The brake piston 33 is arranged in an axially displaceable way within a bore 34 of an inner knuckle 35. The inside diameter of the interior 32 corresponds to the one of the U-shaped recess 20 so that identical brake pads 6,7 with identical leaf springs 10 can be secured in the same way both on the caliper knuckle 19 and on the brake piston 33.

The anchoring tongues 24,25 of the leaf spring 10 have another important function in connection with the support of the brake pads 6,7. In view of the prestress of the anchoring tongues 24,25 in the circumferential direction, the brake pads 6,7 are held, in the circumferential direction, in a defined resting position. After deflection from the resting position in the circumferential direction the brake pads 6,7 are always resiliently pushed back by the anchoring tongues 24,25 into the resting position. With the brake non-applied, the brake pads 6,7 assume their resting positions so that the L-shaped projections are supported only with their oblique faces on the oblique faces 18 of the carrier arms 1,2. In that case, a small distance is adjusted between the bearing faces 13 of the projections 11,12 and the bearing faces 16 of the carrier arms 1,2. Also, a small distance is respectively provided between the support faces 14 of the projections 11,12 and the support faces 17 of the carrier arms 1,2. When applying the brake, the brake pads 6,7 are driven by the brake disk 5 in the circumferential direction until the support 14 on the disk terminating side is in abutment with the appertaining support face 17. To achieve this position, the oblique face 15 of the projection 11 or 12 on the side of the brake disk termination side has slid up the oblique face 18 of the appertaining carrier arm 1 or 2 and the distance has increased between the bearing face 13 of the projection 11 and 12, (on the brake disk terminating side) and the bearing face 16 of the appertaining carrier arm 1 and 2. Conversely, the distance between the bearing faces 13 and 16 reduces and the distance of the support faces 14 and 17 on the brake disk inlet side enlarges, with the brake pad 6,7 being slightly turned about an axis normal to the back plate 8. After the brakes are released the brake pads 6,7 are restored to their resting position. When decelerating in the opposite direction of rotation of the brake disk 5, the brake pads 6,7 are, rotated in the opposite direction of rotation.

This movement of the brake pads 6,7 involves the advantage that resultant corrosion products, if any, due to the grinding movement of the L-shaped projections 11,12 are ground and abraded between the bearing faces 13 and 16, the support faces 14 and 17 and between the oblique faces 15 and 18. The brake pads 6,7 on the carrier arms 1,2, are, therefore, always corrosion-free and are easy to guide and to support.

Figure 6:
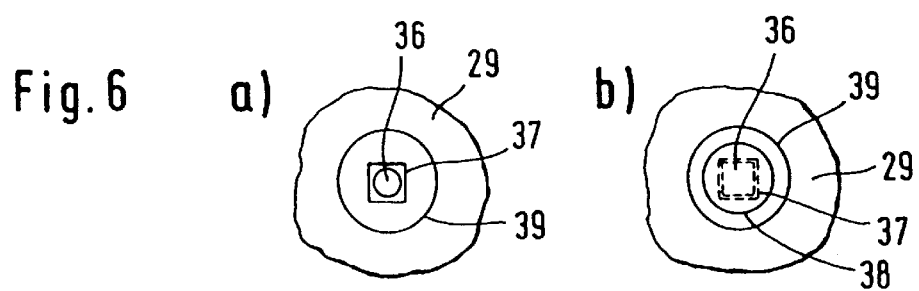
FIGS. 6a and 6b are partial views of the mounting points of the leaf spring before and after riveting respectively.

For mounting the leaf spring 10 on the brake pad 6,7, a punched-through projection 36 of the back plate 8 is provided which is axially moulded from the back plate plane. As best shown in FIG. 6a, the punched-through projection 36 prior to riveting is of a circular cross-section. The mounting section 29 in the center thereof is provided with a square opening 37 intended for the passage of the punched-through projection 36. During manufacturing of the brake pad 6,7, the leaf spring 10 with the opening 37 thereof is plugged onto the circular punched-through projection 36 and relative to the orientation of the anchoring tongues 24,25 and to the spring tongue 28 is placed into the correct angular position. Subsequently, the punched-through projection 36 is deformed by a wobble rivet, with the material being laterally forced into the opening 37 down to the four edges, with the punched-through projection 36 in the area of the square opening 37 equally taking an approximately square cross-section, and with a form lock being generated between the faces of the punched-through projection 36 and the edges of the square opening to prevent the leaf spring 10 from twisting vis-à-vis the brake pad 6,7. The head 38 of the punched-through projection 36 extending beyond the area of the square opening 37 during wobble riveting is deformed to a circular cross-section, holding thereafter the leaf spring 10 forced against the back plate 8 in the axial direction.

To avoid a deformation of the mounting section 29 likely to result in a distortion of the anchoring tongues 24,25 or of the spring tongue 28, a circular step 39 is provided in the area of the square opening 37.

What is claimed is:

1. A floating caliper disk brake for automotive vehicles, comprising:

a brake carrier;

at least one brake pad mounted to said brake carrier with said at least one brake pad supported for transmitting circumferential forces generated during deceleration;

a floating caliper mounted to said brake carrier and embracing an edge of a brake disk and said at least one brake pad;

an outer caliper knuckle portion, said outer caliper knuckle portion including oppositely arranged wall sections and a curved section forming a U-shaped recess, each of said wall sections including a depression, said depression including a radially inner stop and a radially outer stop;

said at least one brake pad including a back plate portion and a spring attached thereto, said spring including a mounting section, a radially resilient tongue, and at least one anchoring tongue, said radially resilient tongue compressibly engaging said curved section of said outer knuckle portion such that a compression force is exerted on said outer knuckle portion in a substantially radial direction from said mounting section thereby radially prestressing said at brake pad against said outer knuckle portion, and each said anchoring tongue engaging each of said corresponding depressions to anchor said brake pad to said brake carrier, a width of said anchoring tongue being less than a space between said outer and said inner stops so that said anchoring tongue is radially displaceable between said stops.

2. The floating caliper disk brake of claim 1, wherein said radially resilient tongue is bent in a V-shape or W-shape.

3. The floating caliper disk brake of claim 1, wherein said brake carrier is integrated into an outer steering knuckle of the automotive vehicle.

4. A floating caliper disk brake for automotive vehicles, comprising:

a brake carrier;

at least one brake pad mounted to said brake carrier with said at least one brake pad supported for transmitting circumferential forces generated during deceleration;

a floating caliper mounted to said brake carrier and embracing an edge of a brake disk and said at least one brake pad;

an outer caliper knuckle portion, said outer caliper knuckle portion including oppositely arranged wall sections and a curved section forming a U-shaped recess, each of said wall sections including a depression, said depression including a radially inner stop and a radially outer stop;

said at least one brake pad including a back plate portion and a spring attached thereto, said spring including a mounting section, a radially resilient tongue, and at least one anchoring tongue, said radially resilient tongue including first and second sections wherein said first section extends away from said back plate and said second section extends back toward said back plate forming a V-shape, said second section compressibly engaging said curved section of said outer knuckle portion such that a compression force is exerted on said outer knuckle portion in a substantially radial direction from said mounting section thereby radially prestressing said at brake pad against said outer knuckle portion, and each said anchoring tongue engaging each of said corresponding depressions to anchor said brake pad to said brake carrier, a width of said anchoring tongue being less than a space between said outer and said inner stops so that said anchoring tongue is radially displaceable between said stops.

5. The floating caliper disk brake of claim 4, herein said brake carrier is integrated into an outer steering knuckle of the automotive vehicle.

6. A floating caliper disk brake for automotive vehicles, comprising:

a brake carrier;

at least one brake pad mounted to said brake carrier with said at least one brake pad supported for transmitting circumferential forces generated during deceleration;

a floating caliper mounted to said brake carrier and embracing an edge of a brake disk and said at least one brake pad;

an outer caliper knuckle portion, said outer caliper knuckle portion including oppositely arranged wall sections and a curved section forming a U-shaped recess, each of said wall sections including a depression, said depression including a radially inner stop and a radially outer stop;

said at least one brake pad including a back plate portion and a spring attached thereto, said spring including a mounting section, a radially resilient tongue, and at least one anchoring tongue, said radially resilient tongue including first, second, third, and fourth sections wherein said first section extends away from said back plate, said second section extends back toward said back plate, said third section extends away from the back plate, and said fourth section extends back towards said back plate forming a W-shape, said fourth section compressibly engaging said curved section of said outer knuckle portion such that a compression force is exerted on said outer knuckle portion in a substantially radial direction from said mounting section thereby radially prestressing said at brake pad against said outer knuckle portion, and each said anchoring tongue engaging each of said corresponding depressions to anchor said brake pad to said brake carrier, a width of said anchoring tongue being less than a space between said outer and said inner stops so that said anchoring tongue is radially displaceable between said stops.

7. The floating caliper disk brake of claim 6, wherein said brake carrier is integrated into an outer steering knuckle of the automotive vehicle.

* * * * *

UNITED STATES PATENT AND TRADEMARK OFFICE
CERTIFICATE OF CORRECTION

PATENT NO : 5,860,495
DATED : January 19, 1999
INVENTOR(S) : Rolf Weiler et al.

It is certified that error appears in the above-identified patent and that said Letters Patent is hereby corrected as shown below:

Col. 6, line 24
replace "herein"
with --wherein--.

Signed and Sealed this

Eleventh Day of May, 1999

Attest:

Q. TODD DICKINSON

Attesting Officer

Acting Commissioner of Patents and Trademarks